March 14, 1961  G. W. ROSS  2,974,326
SPRING INSERT FOR SPRING ASSEMBLIES
Filed May 26, 1958
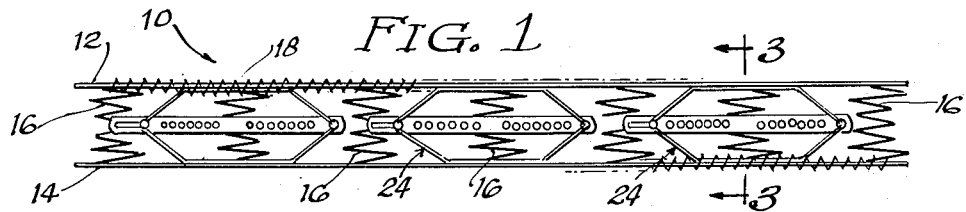
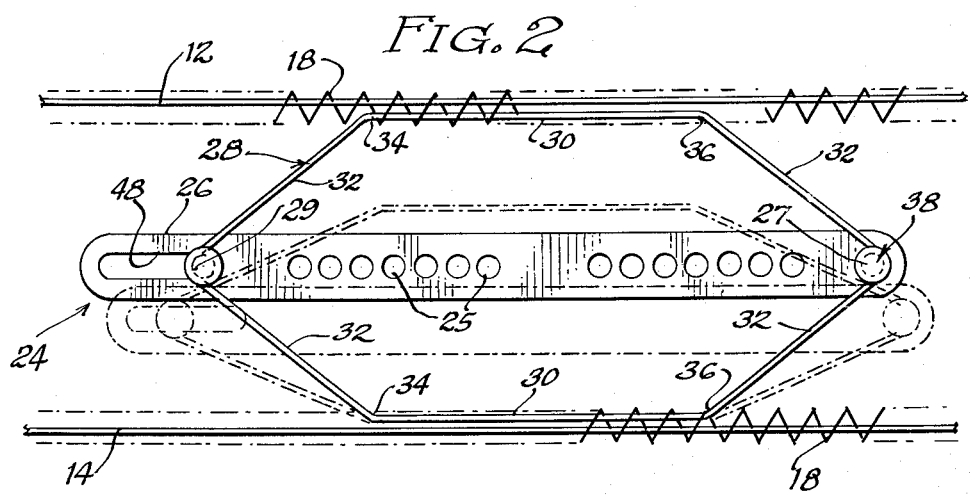
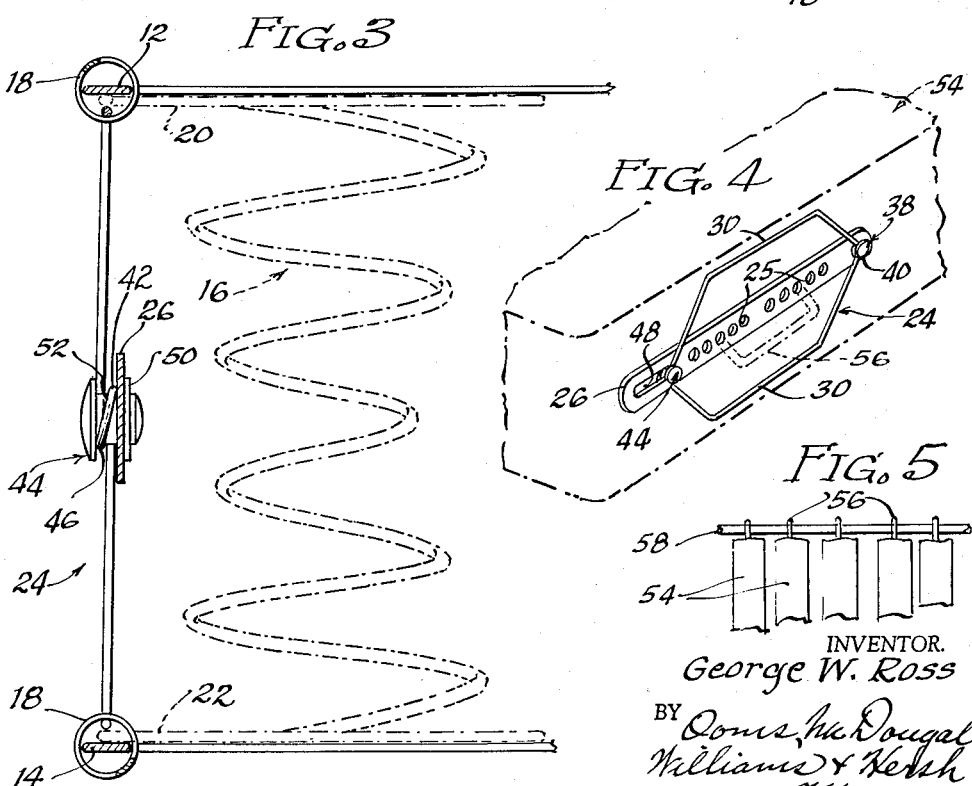
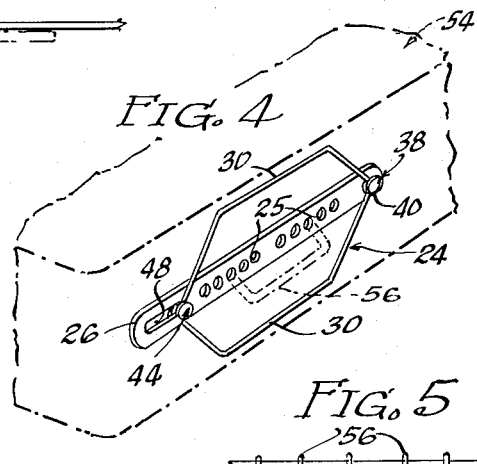
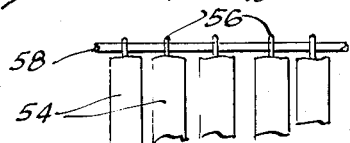
INVENTOR.
George W. Ross
BY Donns McDougall,
Williams & Keith
Attorneys United States Patent Office 2,974,326
Patented Mar. 14, 1961

2,974,326

SPRING INSERT FOR SPRING ASSEMBLIES

George W. Ross, Brighton, Mass., assignor to The United States Bedding Company, St. Paul, Minn., a corporation of Minnesota Filed May 26, 1958, Ser. No. 737,667

7 Claims. (Cl. 5—255)

This invention relates to a spring insert, and more particularly, to a spring insert for reinforcing the periphery of spring assemblies.

The peripheral portion of spring assemblies used in furniture such as bed springs, mattresses, sofas, and the like, are subjected to heavier loads than the central portion, due to the habit that people have of sitting on the edge of the furniture and consequently concentrating their entire weight over a limited area. Consequently, it is desirable for these peripheral portions to be specially reinforced in order to protect the marginal springs from overloads. Spring inserts are a well known means for doing this, but those previously constructed were not completely satisfactory because many of them had a tendency under load to buckle out of the vertical plane of the peripheral edge of the spring assembly. When that happened, they were so deformed that they could no longer reinforce the marginal springs.

In addition, many spring inserts were objectionable because their resilient and reinforcing properties were dependent to a large extent upon the point of application of the load. This happened because some of the component parts of these spring inserts did not cooperate with each other when the load was applied to the spring assembly at certain points. The result, in such cases, was that the tension in the spring insert was unevenly distributed throughout its body so that either all the parts of the spring insert had to be made stronger and more expensive than would otherwise have been necessary, or else the spring inserts were ineffective and peripheral marginally disposed springs were subjected to added strains which ultimately deformed or broke them.

What is needed, therefore, and comprises the principal object of this invention, is to provide a spring insert for reinforcing the peripheral portions of spring assemblies whose resilience is substantially independent of the point of application of the load.

A further object of this invention is to provide a spring insert for reinforcing the peripheral portion of spring assemblies in which all component parts cooperate with each other regardless of the point of application of the load on the spring assembly.

Yet another object of this invention is to provide a spring insert for reinforcing the peripheral portion of spring assemblies which is comparatively resilient to forces applied to it in one plane and comparatively rigid to forces applied to it in planes which are perpendicular to the one plane.

Still another object of this invention is to provide a spring insert for reinforcing the peripheral portions of spring assemblies which also provides a base for a handle.

Another object of this invention is to provide a spring insert formed from inexpensive materials which is easy and economical to manufacture.

Yet a further object of this invention is to provide a spring assembly having detachable parts which can be replaced when damaged without discarding the entire unit.

These and other objects of this invention will become more apparent when read in the light of the accompanying drawings and specifications wherein:

Figure 1 is a side elevational view of a spring assembly with the marginal spring-reinforcing devices mounted along its periphery;

Figure 2 is an enlarged elevational view of a marginal spring-reinforcing device showing in dotted lines its behavior when a load is applied to the spring assembly;

Figure 3 is a sectional view taken on the line 3—3 of Figure 1 and looking in the direction indicated;

Figure 4 is a perspective view of the marginal spring-reinforcing device and a portion of a mattress in which it is positioned, and showing the device combined with a mattress handle; and Figure 5 is a side elevational view showing how the handle portions of the mattresses can be used to carry and suspend the mattresses during storage.

Referring now to Figure 1 of the drawing, a spring assembly indicated generally by the reference numeral 10 and designed for use in furniture such as bed springs, inner spring mattresses, sofas, and the like, comprises spaced parallel upper and lower border frames 12 and 14 respectively, which form its periphery. The border frames may be formed from resilient wire, or as shown in Figure 3, they may be formed from metal straps or bands. These spring assemblies also include a plurality of coil springs 16 arranged in spaced crosswise and lengthwise rows between the border frames. As seen in Figure 1, the marginal coil springs are secured to the upper and lower border frames by means of the usual helical tie wires 18 which encircle both border frames and the upper and lower portions 20 and 22 of the marginal coil springs 16, see Figures 1 and 3, and the other coil springs are interconnected one with the other and the border frames, as by helical tie wires or the like.

To this point, the spring assembly is rather conventional, but experience has shown that it is desirable to reinforce these marginal springs to provide additional support at the edges and to prevent them from being overloaded due to the habit of people sitting upon the side edge portion of the spring assembly, as frequently happens on mattresses or sofas. To prevent this from happening, a series of spring inserts or marginal spring-supporting and reinforcing devices, indicated generally by the reference numeral 24, are provided, see Figure 1. Each of these devices comprises a comparatively straight, rigid support bar 26 and a resilient wire bent to form a closed loop, indicated generally by the reference numeral 28. The support bar 26 is provided with a plurality of openings 25 for reducing the weight of the spring assembly and for saving material. In the embodiment shown, the closed loop happens to be in a common plane and is hexagonal in shape, but although this form is useful and practical, it is not essential to the practice of this invention.

The closed loop 28, in the particular embodiment shown, includes substantially parallel and straight load-engaging portions 30. These portions are disposed on opposite sides of the support bar 26 and are parallel thereto. Angularly disposed connecting portions 32 are formed on the opposite ends 34 and 36 of the load-engaging portions and in the embodiment shown, these connecting portions extend outwardly beyond the ends of the load-engaging portions and into engagement with the support bar 26 at the spaced connecting points 27 and 29, see Figure 2. As seen, the spacing between the connecting points 27 and 29 is greater than the length of the load-engaging portions 30, but as described above, some forms of this invention are contemplated wherein the spacing between the connecting points 27 and 29 may be less than the length of the load-engaging portions, The connection between connecting portions 32 and connecting point 27 on the support bar 26 is by means of a single-headed rivet like stem 38 which is rigidly secured to the support bar 26 by any conventional means, adjacent one end, see Figure 2. As seen in Figure 4, the head 40 of this stem 38 is in spaced relation to the surface of the support bar and a portion of the connecting portion 32 of the closed loop 28 is wound around the stem to form a first resilient coil spring 42.

The connection between connecting portions 32 and the connecting point 29 on the support bar is by means of a double-headed stem 44, which as described below is movably mounted thereon. As seen in Figure 3, a portion of the connecting portions 32 of the resilient wire is bent around the double-headed stem 44 to form a second resilient coil spring 46. With this arrangement, forces which tend to alter the angular relationship between the connecting portions 32 and the load-engaging portions 30 will produce tension in these coil springs which tends to resist these forces. It is evident that the connections between the support bar 26 and the connecting portions 32 may be made removable, if desired, by employing conventional securing means, such as nuts and bolts, so that if one part of the device is damaged it may be replaced without discarding the entire unit.

As seen in Figures 2 and 4, an axially extending guide slot 48 is formed in the support bar 26 and is disposed in a plane which is substantially parallel to the plane of the closed loop 28. This double-headed stem 44 is perpendicular to and extends through the guide slot 48 with the head 50 of the stem 44 and the end 52 of the coil spring 46 slidably engaging the opposite sides of the support bar and movable therealong, see Figure 3.

In assembled relation, these devices 24 are positioned as shown in Figure 2, with the helical tie wires 18 embracing the opposite load-engaging portions 30 and tying them to the upper and lower border frames 12 and 14, so that they are substantially perpendicular to the surfaces of the spring assembly 12, and are in the vertical plane of its peripheral edge. With this arrangement, when a load is applied to furniture, such as a mattress or a sofa in which this spring assembly is mounted, the upper and lower surfaces of the spring assembly will be compressed, and consequently the spacing between the opposed load-engaging portions 30 will decrease. As the spacing between the load-engaging portions decreases, the closed loop 28 becomes elongated as the spacing between the connections 27 and 29 increases due to the movement of the double-headed stem 44 along the guide slot 48. This elongation of the closed loop 28 causes the connecting portions 32 to pivot in a plane which is substantially parallel to the plane of the guide path and the plane of the closed loop, thereby changing the angular relationship between the load-engaging portions 30 and the connecting portions 32. This, as stated above, introduces tension in the coil springs 42 and 46 which causes these devices to resiliently resist those forces which are largely in or parallel to the plane of the closed loop, so that these devices can reinforce the marginal springs 16. On the other hand, these devices are comparatively rigid to forces applied to them which are largely perpendicular to the plane of the closed loop, so that when loads are applied to these spring assemblies these devices strongly resist buckling and the resulting deformations.

Since the effect of forces on the upper and lower load-engaging portions of the device is to move the connecting points 27 and 29 further apart, thereby altering the angular relationship between the load-engaging portions and the connecting portions of the closed loop, it is evident that the resilience offered by these devices will be substantially independent of the point of application of the load, so long as the resulting forces are exerted in the plane of the closed loop and they contact some point on the load-engaging portions 30. Furthermore, it is evident that the movement of these connecting portions 27 and 29 elongating the closed loop causes all its component parts to cooperate with each other regardless of the point of application of the load on this spring assembly.

These devices have another important function in that the support bars 26 provide a base for a handle 56. This is very useful when the spring assembly, for example, is inside of a mattress 54, because loads applied to a handle like the U-shaped handle shown in Figure 4, which is anchored to the support bar 26, will cause the weight of the mattress to be carried by the spring assembly. In this way, despite the weight of the mattress, it can be safely carried or suspended by these handles without damage. In addition, as shown in Figure 5, during storage these mattresses can be suspended on parallel guide bars or runners 58 which extend through these handles so that they can be conveniently handled or moved.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. A device of the class described comprising in combination a comparatively rigid support bar and a resilient wire bent to form a substantially closed loop, said loop including opposed load-engaging portions and connecting portions all in a common plane, said load-engaging portions disposed in spaced relation to said support bar, means for providing spaced spring connections between said connecting portions of said closed loop and spaced points on said support bar, said means including a single-headed stem rigidly secured to the support bar with the head portion in spaced relation thereto, a portion of said resilient wire wound around the stem portion forming a first resilient coil spring, a double-headed stem, another portion of said resilient wire bent around said double-headed stem to form a second resilient coil spring, an elongated guide slot formed in said support bar, said slot disposed in a plane which is substantially parallel to the plane of the closed loop, said double-headed stem perpendicular to and extending through said elongated guide slot with one of the head portions and an end of the second coil spring slidably engaging opposed sides of the support bar and movable therealong so that when such a load is applied to the device the spacing between the first and second coil springs will change producing tension in them and causing said device to resist said load, whereby the device will be comparatively resilient to forces engaging said load-engaging portions which are at least parallel to the plane of the closed loop and comparatively rigid to forces engaging said device which are substantially perpendicular to the plane of the closed loop.

2. In a spring assembly for furniture wherein the spring assembly has spaced upper and lower border frames forming its periphery and marginal springs secured at their upper and lower ends to the upper and lower border frames by means of helical tie wires encircling said border frames and portions of said marginal springs, a series of combined marginal spring-reinforcing devices and furniture handles mounted in spaced relation along the border frame, each device comprising a comparatively rigid support bar and a resilient wire bent to form a substantially closed planar loop, said loop including substantially straight parallel load-engaging portions disposed on opposite sides of the support bar and parallel thereto and angular connecting portions formed on the opposite ends of the load-engaging portions and extending outwardly beyond these ends toward the support bar, means for providing spaced spring connections between said connecting portions of said closed loop and spaced points on said support bar, said means including a single-headed stem rigidly secured to one point on the support bar with the head portion in spaced relation thereto, a portion of said resilient wire wound around the stem portion to form a first resilient coil spring, a double-headed stem, another portion of said resilient wire bent around said double-headed stem to form a second resilient coil spring, an elongated guide slot formed in said support bar, said slot disposed in a plane which is substantially parallel to the plane of the closed loop, said double-headed stem perpendicular to and extending through said elongated guide slot with one of the head portions and an end of the second coil spring slidably engaging the opposed sides of the support bar and movable therealong so that when a load is applied to the furniture with force components largely parallel to the plane of the closed loop the spring connections on said support bar will move apart as the double-headed stem moves along said guide slot, thereby changing the angular relationship between the load-engaging portions and the connecting portions and introducing tension in the coil springs whereby the devices will be comparatively resilient and will reinforce the marginal springs, and when loads are applied to the furniture with force components largely perpendicular to said plane of the closed loop the devices will be comparatively rigid, and a handle member rigidly secured to the support bar.

3. In a spring assembly for furniture wherein the spring assembly has spaced upper and lower border frames and a plurality of coil springs arranged within the border frame members with the marginal portions of the terminal coils of the outermost coil springs secured to the adjacent portions of the border frame members, a plurality of marginal spring supporting devices mounted in longitudinal spaced apart relation between the upper and lower border frame members, each such device comprising a relatively rigid support bar and a resilient wire bent to form a substantially closed loop, said loop including opposed load-engaging portions and connecting portions all in a common plane, said load-engaging portions being disposed in spaced relation from opposite sides of said support bar, means for providing spaced spring connections between said connecting portions of said closed loop and longitudinal spaced apart points on said support bar including a single-headed stem rigidly secured to the support bar with the head portion in spaced relation thereto, a portion of said resilient wire being wound about the stem portion forming a first resilient coil spring, a double-headed stem, another portion of said resilient wire bent around said double-headed stem to form a second resilient coil spring, an elongated guide slot formed in said support bar and disposed in a plane which is substantially parallel to the plane of the closed loop, said double-headed stem extending through said elongated guide slot for slidable engagement therein, means interconnecting the opposite load-engaging portions with the opposite border frame members to position the spring supporting device therebetween such that when load is applied to the edge portion of the spring, the spaced relation between the load-bearing members will change to produce a tensioned relation in the spring connection therebetween whereby the device will operate constantly to urge the load-engaging portions in a direction away from each other to resist such deformation forces.

4. In a spring assembly wherein the spring assembly has spaced upper and lower border frames and a plurality of coil springs within the border frame members with the marginal portions of the terminal coils of the outermost coil springs secured to the adjacent portions of the border frame members, a plurality of separate marginal spring supporting devices mounted in longitudinally spaced apart relation between the upper and lower border frame members, each of said devices comprising a relatively rigid support bar, a resilient wire bent to form a substantially closed loop of prismatic shape, said loop including opposed load-engaging portions and connecting portions all in a common plane, said load-engaging portions being disposed in spaced substantially parallel relation from the opposite sides of said support bar, said support bar extending in alignment with said connecting portions of said closed loop, means for providing spaced spring connections between said connecting portions of said closed loop and longitudinally spaced apart portions of said support bar including a means operatively connecting one of said connecting portions of the closed loop with one end portion of said support bar, an elongate guide slot in the opposite end portion of said support bar and disposed in a plane which is parallel to the plane of the closed loop, and a means slidably received within said elongate slot for longitudinal displacement therein and to which the other of said connecting portions of the closed loop is connected, means interconnecting said opposite load-engaging portions with the opposite border frame members to position the spring supporting device therebetween such that when load is applied to the edge portion of the spring, the spaced relation between the load-bearing members will change subsantially equally with reference to the support bar to produce a tensioned relation in the spring connection therebetween whereby the device will operate constantly to urge the load-engaging portions in a direction away from each other to resist such deformation forces.

5. A device as claimed in claim 4 in which the loop of prismatic shape comprises a loop of hexagonal shape having a pair of opposite sides disposed parallel to the support bar as the load engaging portion and the apex portion between the opposite sides located intermediate the load-bearing side and alongside the support bar comprising the connecting portions.

6. A device as claimed in claim 4 in which the slidability connection between the looped portion and the support bar comprise a pin slidable in the slot and an operative connection between the pin and the connecting portion.

7. In a spring assembly comprising upper and lower border frame members, a device as claimed in claim 4 dimensioned to position the load-bearing sides adjacent said upper and lower border frame members, and means interconnecting said sides to said upper and lower border frame members to position the device crosswise therebetween.

References Cited in the file of this patent

UNITED STATES PATENTS

| | | |
|---|---|---|
| 807,314 | Pepple | Dec. 12, 1905 |
| 935,703 | Smith | Oct. 5, 1909 |
| 2,509,831 | Martin | May 30, 1950 |

FOREIGN PATENTS

| | | |
|---|---|---|
| 728,882 | Great Britain | Apr. 27, 1955 |